(12) United States Patent
Cho et al.

(10) Patent No.: US 10,037,247 B2
(45) Date of Patent: Jul. 31, 2018

(54) MEMORY SYSTEM HAVING IDLE-MEMORY DEVICES AND METHOD OF OPERATING THEREOF

(71) Applicant: SK hynix Inc., Gyeonggi-do (KR)

(72) Inventors: Sung Yeob Cho, Gyeonggi-do (KR); Dong Yeob Chun, Seoul (KR)

(73) Assignee: SK Hynix Inc., Gyeonggi-do (KR)

( * ) Notice: Subject to any disclaimer, the term of this patent is extended or adjusted under 35 U.S.C. 154(b) by 254 days.

(21) Appl. No.: 15/048,514

(22) Filed: Feb. 19, 2016

(65) Prior Publication Data

US 2017/0068604 A1    Mar. 9, 2017

(30) Foreign Application Priority Data

Sep. 7, 2015   (KR) .......................... 10-2015-0126374

(51) Int. Cl.
*G06F 11/00* (2006.01)
*G06F 11/14* (2006.01)

(52) U.S. Cl.
CPC ...... *G06F 11/141* (2013.01); *G06F 2201/805* (2013.01); *G06F 2201/85* (2013.01)

(58) Field of Classification Search
CPC ............. G06F 11/1402; G06F 11/1405; G06F 11/1407; G06F 11/141; G06F 11/1446; G06F 11/1666; G06F 11/2017
See application file for complete search history.

(56) References Cited

U.S. PATENT DOCUMENTS

| | | | | |
|---|---|---|---|---|
| 5,418,916 | A * | 5/1995 | Hall | G06F 11/1407 711/E12.024 |
| 9,478,289 | B1 * | 10/2016 | Hong | G11C 15/04 |
| 2005/0102582 | A1 * | 5/2005 | Fuente | G06F 11/1435 714/42 |
| 2005/0128830 | A1 * | 6/2005 | Nishihara | G11C 29/44 365/200 |
| 2013/0159604 | A1 * | 6/2013 | Yeh | G06F 12/0246 711/103 |
| 2014/0189417 | A1 * | 7/2014 | Hum | G06F 11/004 714/2 |
| 2014/0297919 | A1 * | 10/2014 | Nachimuthu | G11C 14/009 711/102 |
| 2017/0147490 | A1 * | 5/2017 | Arafa | G06F 12/0804 |
| 2018/0089035 | A1 * | 3/2018 | Woo | G06F 11/1456 |

FOREIGN PATENT DOCUMENTS

| | | | |
|---|---|---|---|
| KR | 1020090050382 | 5/2009 | |
| KR | 1020130116110 | 10/2013 | |
| KR | 1020140142793 | 12/2014 | |
| KR | 1020150028610 | 3/2015 | |
| WO | WO-2015164049 A1 * | 10/2015 | .......... G06F 11/1666 |

* cited by examiner

*Primary Examiner* — Gabriel L Chu
(74) *Attorney, Agent, or Firm* — IP & T Group LLP

(57) ABSTRACT

The memory system may include a memory device including a plurality of sub-memory devices coupled to a channel; and a controller suitable for controlling the memory device to store a first data into a selected sub-memory device and at least one idle sub-memory device among the sub-memory devices during a first program operation to a selected sub-memory device among the sub-memory devices with the first data with a first data; and to perform a second program operation to the selected sub-memory device with the first data stored in the idle sub-memory device when the first program operation to the selected sub-memory device fails.

20 Claims, 6 Drawing Sheets

MEMORY SYSTEM HAVING IDLE-MEMORY DEVICES AND METHOD OF OPERATING THEREOF

CROSS-REFERENCE TO RELATED APPLICATION

The present application claims a priority to a Korean patent application number 10-2015-0126374 filed on Sep. 7, 2015, the entire disclosure of which is incorporated herein in its entirety by reference.

BACKGROUND

Field of Invention

The present disclosure relates generally to semiconductor memory technology and in particular to a memory system including a controller and a memory device and a method of operating the same.

Description of Related Art

Memory systems are used widely in a variety of applications including as memory components in digital devices such as computers, digital cameras, audio players, smartphones and the like. A memory system may typically include a memory device for storing data and a controller for controlling the operation of the memory device. When the memory system is linked to a digital device acting as a host, the controller may communicate commands and data between the host and the memory device.

Recently, digital devices require large amounts of data. For this reason, a digital device may employ a memory device including multiple sub-memory device groups, each sub-memory device group including multiple sub-memory devices. Typically, each group may communicate via a single channel with the controller. Thus, a memory system may have multiple channels.

In a memory system including multiple channels, there may be an increase in communications between the controller and the sub-memory devices, placing an increased load requirement on the controller. For example, during a program operation, the controller may temporarily store data as a preparation for a program failure for a selected sub-memory device. However, due to the increase in the number of the sub-memory devices, the temporal data in the controller may accordingly increase substantially, leading to a substantial increase on the load of the controller.

SUMMARY

The present disclosure provides a memory system having a controller with less load, and a method of operating the same.

In one aspect of the present disclosure, there is provided a memory system including: a memory device including a plurality of sub-memory devices coupled to a channel; and a controller suitable for controlling the memory device to store a first data into a selected sub-memory device and at least one idle sub-memory device among the sub-memory devices during a first program operation to a selected sub-memory device among the sub-memory devices with the first data with a first data; and to perform a second program operation to the selected sub-memory device with the first data stored in the idle sub-memory device when the first program operation to the selected sub-memory device fails.

In one aspect of the present disclosure, there is provided a method of operating a memory system including: inputting first data into a first sub-memory device and a second sub-memory device coupled to a same channel; performing a first program operation of the first sub-memory device with the first data inputted into the first sub-memory device; and performing a second program operation to the first sub-memory device with the first data stored in the second sub-memory device when the first program operation fails.

In one aspect of the present disclosure, there is provided a method of operating a memory device including: inputting a program command for a first program operation of a first sub-memory device into the first sub-memory device and a second sub-memory devices; inputting an address and a first data for the first program operation into the first and second sub-memory devices; inputting a program start command for the first program operation into the first sub-memory device; and inputting a program holding command to the second sub-memory device to stay idle during the first program operation.

In accordance with the present disclosure, during the program operation to the selected sub-memory device, the same data may be stored temporarily in the non-selected sub-memory devices, resulting in the controller with a less necessary storage. This may lead to an improved performance.

DETAILED DESCRIPTIONS

Figure 1:
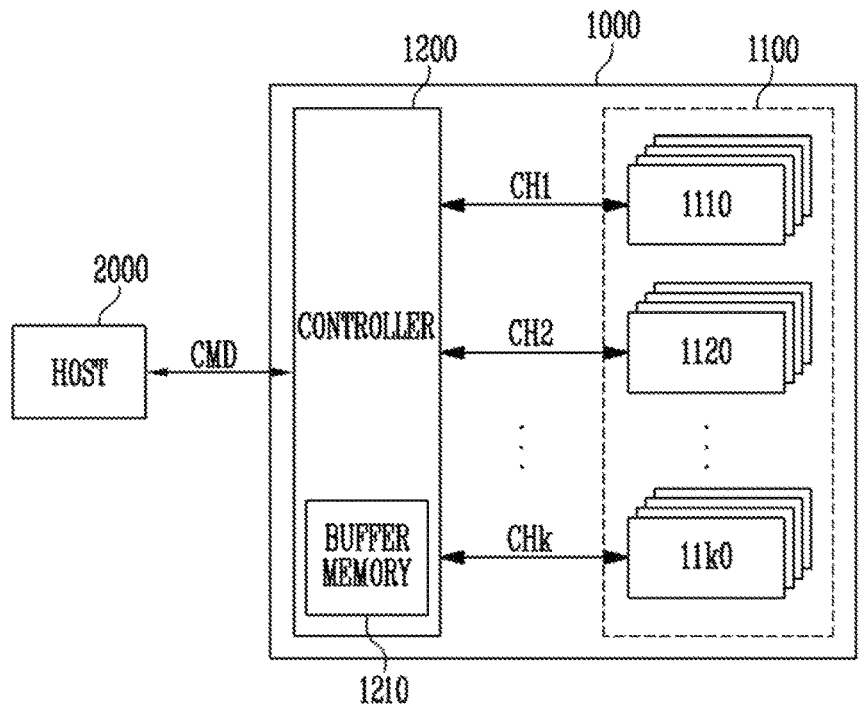
FIG. 1 is a diagram of a memory system, according to an embodiment of the present disclosure.

Various embodiments will be described with reference to the accompanying drawings. It is noted, however, that the present disclosure may be embodied in various different forms, and should not be construed as being limited to only the described embodiments. Rather, these embodiments are provided as examples so that this disclosure will be thorough and complete.

It is also noted that although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "connected to", or "coupled to" another element or layer, it can be directly connected to, or coupled to the other element or layer, or it may be indirectly connected to, or coupled to the other element or layer via one or more intervening elements or layers. In addition, it will also be understood that when an element or layer is referred to as being "between" two elements or layers, it can be the only element or layer between the two elements or layers, or one or more intervening elements, layers, or void space may also be present.

Moreover, it is noted that the terminology used herein is for the purpose of describing particular embodiments only and is not intended to limit the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, steps, elements, and/or components, and do not preclude the presence or addition of one or more other features, integers, operations, steps, elements, components, and/or groups thereof. As used herein, the term "and/or" includes any and all combinations of one or more of the associated listed items.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

In the following description, numerous specific details are set forth in order to provide a thorough understanding of the present disclosure. The present disclosure may be practiced without some or all of these specific details. In other instances, well-known process structures and/or processes have not been described in detail in order not to unnecessarily obscure the present disclosure.

Hereinafter, various embodiments of the present disclosure will be described with reference to the drawings.

FIG. 1 is a diagram of a memory system, according to an embodiment of the present disclosure.

Referring to FIG. 1, a memory system 1000 is provided according to an embodiment of the present disclosure. The memory system 1000 may include a memory device 1100 for storing data and a controller 1200 for controlling operation of the memory device 1100.

The memory device 1100 may include multiple sub-memory device groups 1110, 1120 and 11$k$0. Each sub-memory device group 1110, 1120 and 11$k$0 may include a multiple sub-memory devices.

Each sub-memory device group 1110, 1120 and 11$k$0 may communicate with a controller 1200 over a corresponding channel CH1 to CHk wherein k is a positive integer.

The controller 1200 may receive a command CMD from a host 2000, and may control each sub-memory device group 1110, 1120 and 11$k$0 via a corresponding channel CH1 to CHk based on the received command CMD. Further, the controller 1200 may include a buffer memory 1210 for storing data temporarily for a program (also referred to as a write operation), read or erase operation.

The buffer memory 1210 may have a storage capacity limit that may be less than the storage capacity of the memory device. When the buffer memory 1210 stores various data, the controller 1200 may be subjected to an increased load. In such a case, according to an embodiment of the present disclosure, at least one idle sub-memory device may serve for storing data temporarily therein. As used herein, the term "idle sub-memory device" refers to a non-selected sub-memory device in the same sub-memory device group for the program operation. It may be appreciated that a selected sub-memory device for the program operation and an idle sub-memory device may belong to the same sub-memory device group and, thus may have the same configuration. In an embodiment, a selected sub-memory device and an idle sub-memory device belong in the same sub-memory device group and are substantially identical.

A selected sub-memory device and an idle sub-memory device may be distinguished from each other via an address provided by the controller 1200 during the program operation. In turn, the controller 1200 may separately control each selected sub-memory device and the idle sub-memory device. During the program operation, the controller 1200 may store data into the selected sub-memory device, and, at the same time or subsequently, may further store the same data into the at least one idle sub-memory device. The latter storage may be a temporary storage. The temporarily stored data of the idle sub-memory device or devices may be used for a subsequent re-program operation to the selected sub-memory device when the current program operation to the selected sub-memory device fails.

Figure 2:
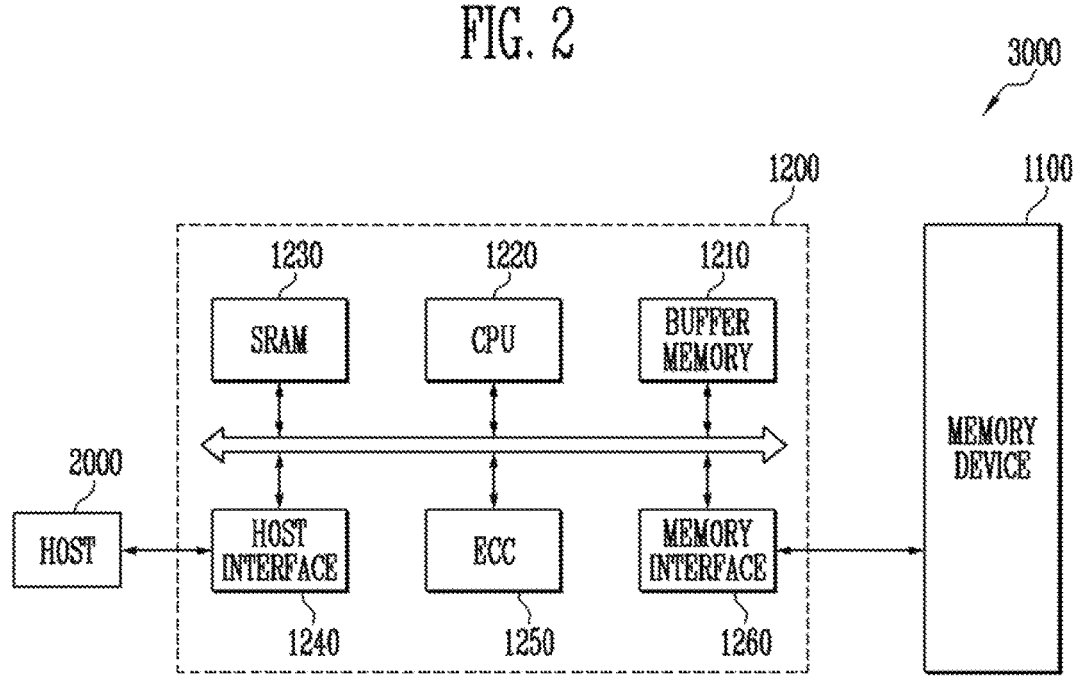
FIG. 2 is a diagram of a memory system, according to another embodiment of the present disclosure.

FIG. 2 is a diagram of a memory system, according to another embodiment of the present disclosure.

Referring to FIG. 2, a memory system 3000 according to an embodiment of the present disclosure may include the memory device 1100 for storing data, and the memory controller 1200 for controlling the memory device 1100. Further, the memory controller 1200 may control a communication between a host 2000 and the memory device 1100. The memory controller 1200 may include a buffer memory 1210, CPU 1220, SRAM 1230, host interface 1240, ECC module 1250 and the memory interface 1260.

The buffer memory 1210 may temporarily store therein data while the memory controller 1200 may control the memory device 1100. The CPU 1220 may control a data exchange of the controller 1200. The SRAM 1230 may act as a work memory for the CPU 1220. The host interface 1240 may have a data exchange protocol for a host 2000 coupled to the memory system 3000. The ECC (error correction code) module 1250 may detect and correct an error in data read from the memory device 1100. The memory interface 1260 may interface with the memory device 1100. Further, although not shown, it is noted that the memory system 3000 may comprise a ROM (not shown) for storing coded data for interfacing with a host system or host 2000.

The CPU 1220 may be configured to run firmware such as a flash translation layer (FTL). The flash translation layer (FTL) may have a variety of functions. According to an embodiment, the flash translation layer (FTL) may include a variety of layers such as a program timing layer, a retrieval layer, an address mapping layer, a reading correction layer, and the like. According to an embodiment, when a program operation to a selected page fails, the flash translation layer (FTL) may change the selected page address to another page address in an associated memory block or may change a current memory block address to another memory block address. The new page address or memory block address may be delivered via the memory interface 1260 to the memory device 1100.

Figure 3:
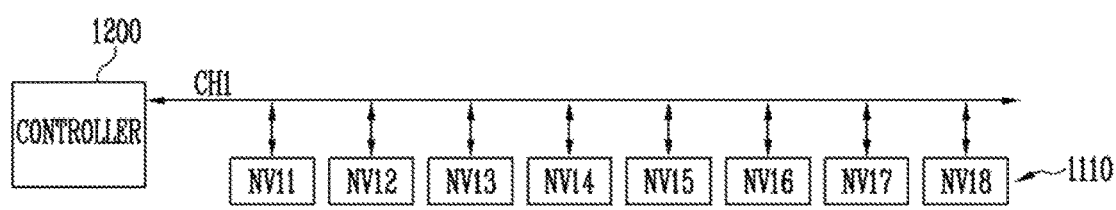
FIG. 3 is a diagram of an example of a single sub-memory device group shown in FIG. 1.

FIG. 3 illustrates a connection relation between the first sub-memory device group 1110 of the memory device 1100 of FIG. 1 and the controller 1200. Each remaining sub-memory device group 1120 to 11k0 may have a similar connection relation with the controller 1200.

The first sub-memory device group 1110 may include a plurality sub-memory devices NV11 to NV18, all being coupled to a single first channel CH1. Although this example shows that the first sub-memory device group 1110 includes eight sub-memory devices NV11 to NV18, it is noted that the present disclosure is not limited in this way. Fewer or more sub-memory devices than the eight sub-memory devices may be included in a sub-memory device group depending on the memory system. The sub-memory devices NV11 to NV18 may each be implemented in a volatile memory device or a non-volatile memory device. For example, a sub-memory device may be implemented with a non-volatile memory device when employed in a portable electronic device. In an embodiment, each of the sub-memory devices NV11 to NV18 may be or comprise a NAND flash memory device.

Figure 4:
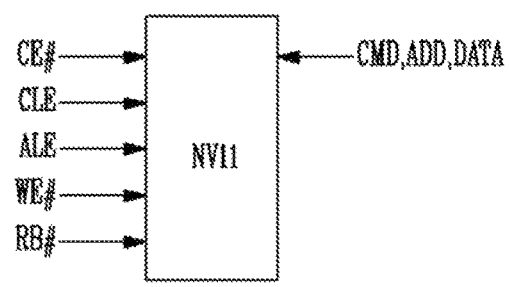
FIG. 4 is a diagram of an example of a single sub-memory device shown in FIG. 3.

FIG. 4 is a diagram of the first sub-memory device NV11 of FIG. 3. It is noted that each remaining second to eighth sub-memory devices NV12 to NV18 of FIG. 3 may have the same configuration as the first sub-memory device NV11.

Referring to FIG. 4, the first sub-memory device NV11 may receive, via the first channel CH1 (shown in FIGS. 2 and 3), a chip enable signal CE#, a command latch enable signal CLE, an address latch enable signal ALE, a write enable signal WE#, a ready-busy signal RB#, a command CMD, an address ADD and data DATA, and the like. The chip enable signal CE# may be selectively applied to the sub-memory devices coupled to a single channel, while each remaining signals CLE, ALE, WE#, and RB#, and the command CMD, address ADD, and data DATA may be commonly applied to the sub-memory devices coupled to the single channel. According to an embodiment, the chip enable signal CE# may be selectively applied to each sub-memory devices NV11 to NV18 coupled commonly to the first channel CH1, while each remaining signals CLE, ALE, WE#, and RB#, and the command CMD, address ADD, and data DATA may be commonly applied to the sub-memory devices NV11 to NV18 coupled commonly to the first channel CH1.

The chip enable signal CE# may be applied as a low value to a selected sub-memory device when the command CMD, address ADD or data DATA may be inputted to the selected sub-memory device. In this connection, remaining non-selected (idle) sub-memory devices may have the chip enable signal CE# as a high value applied thereto. The command latch enable signal CLE may be set to a high value when the command CMD may be inputted to the sub-memory device(s). The address latch enable signal ALE may be set to a high value when the address ADD may be inputted to the sub-memory device(s). The ready-busy signal RB# may be set to a low value when the selected sub-memory device is performing a program operation. The command CMD and address ADD may be inputted to the selected sub-memory device when the write enable signal WE# may transition from a high value to a low value.

Figure 5:
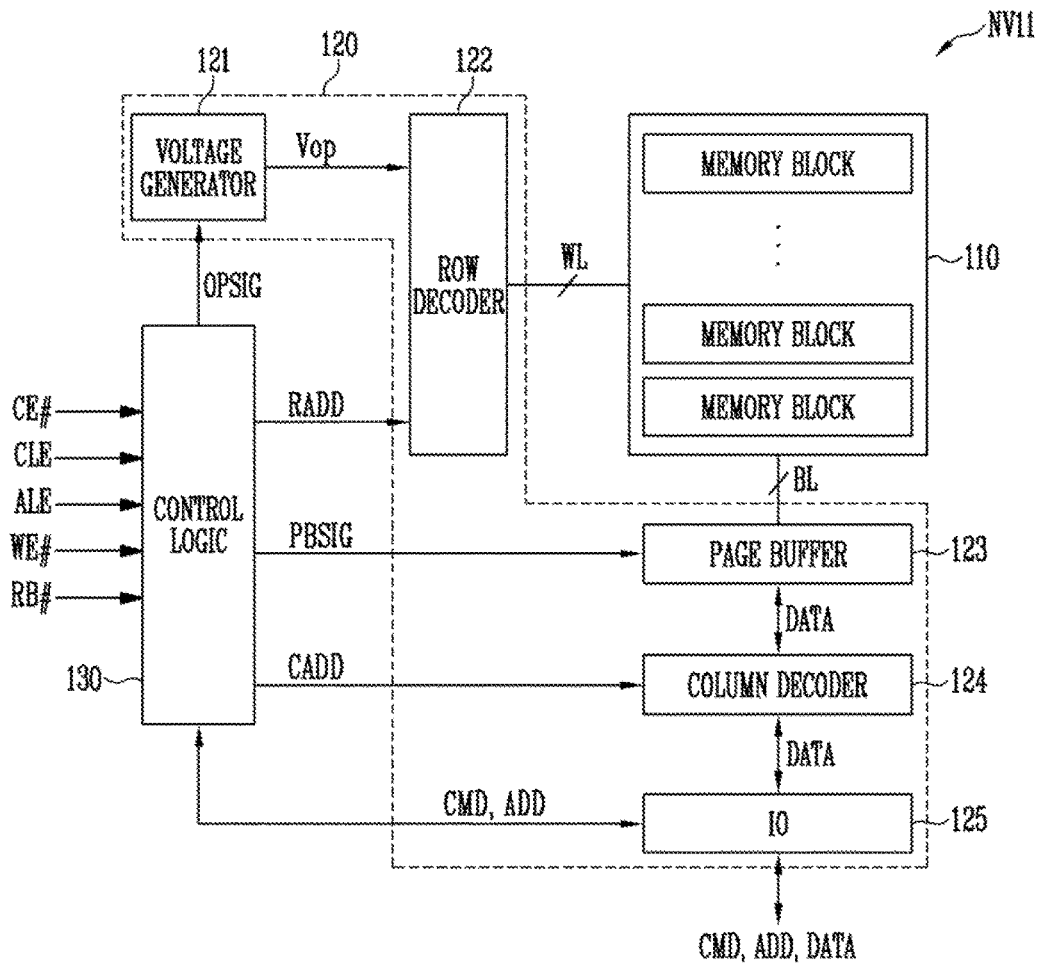
FIG. 5 is a block diagram of an example of a sub-memory device shown in FIG. 4.

FIG. 5 is a detailed block diagram of the first sub-memory device NV11 of FIG. 4. Each remaining second to eighth sub-memory devices NV12 to NV18 in FIG. 3 may have the same configuration as the first sub-memory device NV11. Specifically, the first sub-memory device NV11 may include a memory cell array 110 configured to store data therein, a peripheral circuit 120 configured to perform a program, read or erase operation for the memory cell array 110, and a control logic 130 configured for controlling the peripheral circuit 120.

The memory cell array 110 may include multiple memory blocks. The memory blocks may have the same configuration. Each memory block may have a two-dimensional or three-dimensional structure. Each memory block may have multiple strings (not shown) including memory cells.

The peripheral circuit 120 may include a voltage generator 121, a row decoder 122, a page buffer 123, a column decoder 124 and an input/output circuit 125.

The voltage generator 121 may generate a variety of levels of operation voltages Vop in response to an operation signal OPSIG. According to an embodiment, upon a program operation signal OPSIG, the voltage generator 121 may generate a program voltage for the program operation, a program pass voltage, a program verification voltage, and the like.

The row decoder 122 may deliver the operation voltage Vop to word-lines WL coupled to the memory blocks selected in response to a row address RADD.

The page buffer 123 may be connected via bit-lines BL to the memory cell array 110. In response to a page buffer control signal PBSIG, the buffer 123 may pre-charge the bit-lines BL, or may provide data to the selected memory blocks during a program operation, or may temporarily store data provided from the selected memory blocks during a read operation.

The column decoder 124 may communicate data DATA with the page buffer 123 in response to a column address CADD, or may communicate data DATA with the input/output circuit 125.

The input/output circuit 125 may be configured to deliver the command CMD, and address ADD from an external device (for example, the memory controller 1200 in FIG. 2) to the control logic 130, and/or to deliver data DATA from the external device to the column decoder 124, or to output data DATA from the column decoder 12 to the external device.

The control logic 130 may be configured to output the operation signal OPSIG, row address RADD, page buffer control signal PBSIG and column address CADD in response to the command CMD and address ADD. According to an embodiment, upon a receipt of a program command CMD, the control logic 130 may be configured for controlling the peripheral circuit 120 to allow the page buffer 123 for storing data DATA. Upon a receipt of a program start command CMD, the control logic 130 may be configured for controlling the peripheral circuit 120 to allow the data DATA in the page buffer 123 to be programmed into a selected memory block. Further, upon a receipt of a holding command CMD, the control logic 130 may be configured for controlling the peripheral circuit 120 to disallow the program operation and maintain the data DATA in the page buffer 123.

Figure 6:
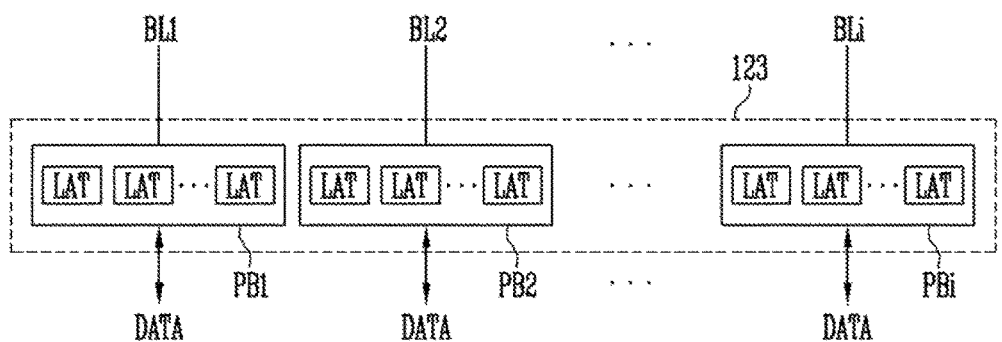
FIG. 6 is a diagram of an example of a page buffer shown in FIG. 5.

FIG. 6 is a diagram of an example of a page buffer shown in FIG. 5.

Referring to FIG. 6, the page buffer 123 may include first to i-th sub-page buffers PB1 to PBi. The first to i-th page buffers PB1 to PBi may be respectively coupled to first to i-th bit-lines BL1 to BLi. The first to i-th page buffers PB1 to PBi may include a plurality latches LAT, each latch storing temporarily therein data from the column decoder (124 in FIG. 4). Each sub-page buffers PB1 to PBi may include at least two latches LAT. According to an embodiment, each latch may store the received data from the column decoder 124 or may store data to be inputted to the bit-lines BL1 to BLi during the program operation. In case of a multi-level cell (MLC) capable to store two (2) or more bits data into a single memory cell, each page buffer PB1 to PBi may include at least three latches LAT.

Figure 7:
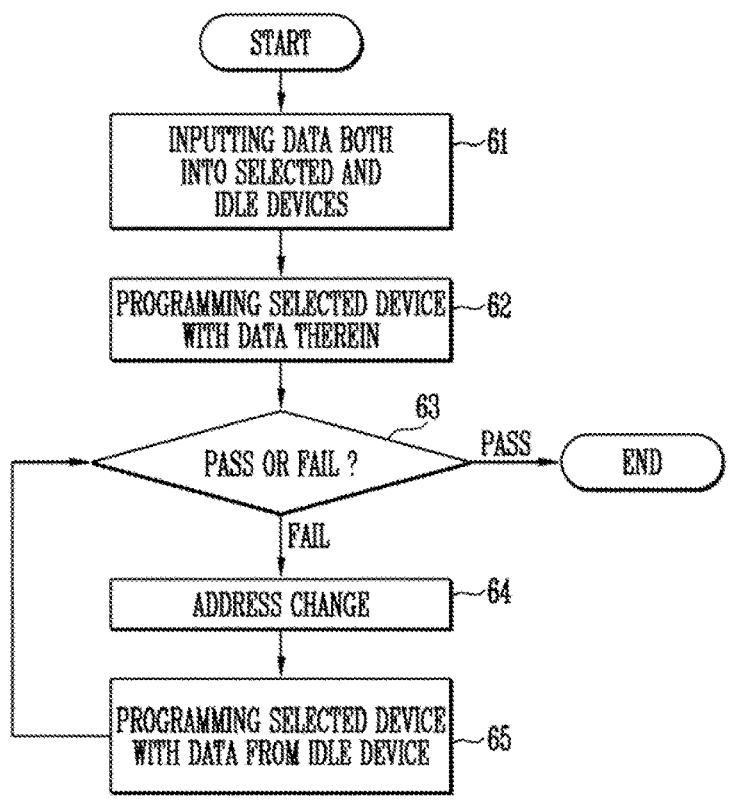
FIG. 7 is a flowchart of a program operation, according to an embodiment of the present disclosure.

FIG. 7 is a flowchart of a program operation according to an embodiment of the present disclosure. Referring to FIG. 7, when the controller 1200 receives a program command CMD, the controller 1200 may input the same data both into a selected sub-memory device for the program operation and at least one idle (i.e. non-selected) sub-memory device for the program operation as step 61. For example, the selected sub-memory device and the at least one idle sub-memory device may be included in the first sub-memory device group 1110 in the memory device 1100. The data may be inputted, at the same time, sequentially, or overlapping, both into a page buffer in the selected sub-memory device and a page buffer (or page buffers) in the at least one idle sub-memory device. When the selected sub-memory device falls in a program-failed state, the data in the page buffer of the at least one idle sub-memory device may be employed. Although the selected sub-memory device and idle sub-memory device(s) may have the same data inputted thereto, the selected sub-memory device may perform a programming operation, and the idle sub-memory devices may just maintain the data without the programming operation. This may be based on commands inputted respectively to the selected sub-memory device and the idle sub-memory device(s) after the same data inputting.

At step 62, the controller 1200 may control the peripheral circuit to perform a program operation to a selected page of the selected sub-memory device with the data stored in the page buffer in response to a program start command. When the selected sub-memory device is performing the program operation, the at least one idle sub-memory device may hold the program operation in response to a holding command. The program operation may be performed on a page basis. The page may refer to a group of memory cells coupled respectively to word-lines. The program operation may be performed through an Incremental Step Pulse Program (ISPP) so that a program voltage may increment in a step-wise fashion. In the ISPP approach, multiple program loops may be carried out until a threshold voltage of each memory cells in the selected page reaches a target level.

At step 63, it is determined whether the program operation for the selected page passes or fails. According to an embodiment, each of the program loops may include applying the program voltage to the word-lines coupled to the selected page, and verifying the selected page for the program operation.

Upon the determination that the program operation for the selected page passes, it may be deemed that the threshold voltage of each memory cells in the selected page reaches the target level and the program operation for the selected page may end.

Upon the determination that the program operation for the selected page fails although the program loops may be carried out to a maximum number, an address may be changed for another selected page at step 64. For example, the address change may occur in the same memory block, or the address change may occur between different memory blocks. In the latter case, the address may be changed for another page of another memory block. For example, such a change may be made using the CPU 1220 in the controller 1200.

According to completion step 64 of the address change, the controller 1200 may perform the program operation to the selected sub-memory device with the data temporarily stored in the at least one idle sub-memory device at step 65. According to an embodiment, the controller 1200 may perform the program operation according to the address changed at step 64. To be specific, the controller 1200 may transfer the data temporarily stored in the at least one idle sub-memory device to a page buffer of the selected sub-memory device via the buffer memory 1210. Next, the controller 1200 may control the peripheral circuit to perform a program operation to the selected sub-memory device with data provided from the at least one idle sub-memory device according to the address changed at step 64.

A program operation may be implemented in a variety of embodiments as described below.

Figure 8:
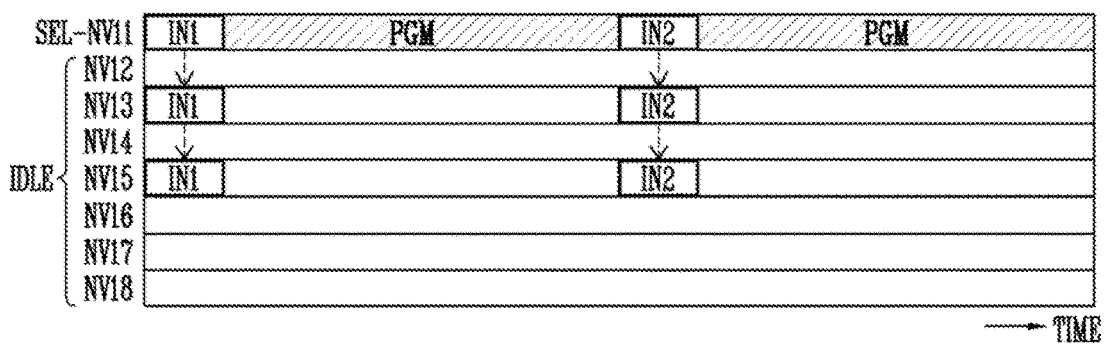
FIG. 8 is an example of a timing diagram of the program operation in FIG. 7.

FIG. 8 is a timing diagram illustrating an embodiment of the program operation of FIG. 7.

Referring to FIG. 8, the program operation may proceed in a timing sequence as shown in order to perform a program operation to a selected sub-memory device SEL among sub-memory devices NV11 to NV18 coupled to the same channel. The selected sub-memory device SEL may be a first sub-memory device NV11 while remaining non-selected second to eighth sub-memory devices NV12 to NV18 may be idle sub-memory devices IDLE. From among the idle sub-memory devices IDLE, at least one idle sub-memory device may temporarily store the same data as the first sub-memory device NV11 stores. According to an embodiment, two or more idle sub-memory devices may each temporarily store the same data. In this example, the idle sub-memory devices NV13 and NV15 may each temporarily store the same data. While at least two idle sub-memory devices may each temporarily store the same data, a new command for another operation such as the read operation may be provided to the at least two idle sub-memory device. In this case, except for at least one of the at least two idle sub-memory device, the page buffers of remaining idle sub-memory devices may be reset. Thereafter, the controller 1200 may perform the peripheral circuit to perform the read operation to the remaining idle sub-memory devices in response to the provided read command. For example, when the read command may be inputted to the idle sub-memory devices NV13 and NV15, a page buffer of one of the idle sub-memory devices NV13 and NV15 may be reset while the other may have the data of the selected sub-memory device NV11 therein at a page buffer thereof.

First Data Input Interval IN1

During a first data input interval IN1, the selected first sub-memory device NV11 and the idle third and fifth sub-memory devices NV13 and NV15 all may receive the same data. According to an embodiment, the same data may be inputted, at the same time, into a page buffer of the selected first sub-memory device NV11, and respective page buffers of the idle third and fifth sub-memory devices NV13 and NV15. The data from the idle third and fifth sub-memory devices NV13 and NV15 may be used. The data from the buffer memory may not be used. Before the data is inputted to each selected and the idle sub-memory devices NV11, NV13 and NV15, addresses may be inputted to the selected and the idle sub-memory devices NV11, NV13 and NV15. The input of the addresses will be described in more detail with reference to FIG. 9.

First Program Interval PGM1

During a first program interval PGM1 after the first data input interval IN1, the controller 1200 may control the peripheral circuit to perform a program operation to the selected first sub-memory device NV11 with the data stored in the page buffer (for example, a sub-page buffer corresponding to a selected page) of the selected first sub-memory device NV11. According to an embodiment, the program operation may be performed with respect to the selected memory page in a selected memory block in the selected first sub-memory device NV11. While in this state, a program operation may not be performed with respect to the idle third and fifth sub-memory devices NV13 and NV15.

When the selected first sub-memory device NV11 comes into a program-fail state, the controller 1200 may transfer the data from the idle third or fifth sub-memory device NV13 or NV15 to the selected first sub-memory device NV11 via the buffer memory 1210. For example, the controller 1200 may change an address indicating another page of the same memory block or a page of another memory block in the selected first sub-memory device NV11 for the program operation. Then, the controller 1200 may control the peripheral circuit to perform a program operation to the selected first sub-memory device NV11 according to the changed address. Alternatively, the controller 1200 may change the selected sub-memory device from the first sub-memory device NV11 to one of the second to eighth idle sub-memory devices NV12 to NV18 for the program operation.

When the selected page of the selected first sub-memory device NV11 has a program-success thereto, the page buffers (more specifically, the sub-page buffers PB1 to PBi in FIG. 5) of the idle third and fifth sub-memory devices NV13 and NV15 may be respectively reset. Then, the controller 1200 may control the peripheral circuit to perform a program operation to a next page of the selected first sub-memory device NV11. Upon completion of the program operation to the selected page, the next page may be subjected to the program operation. The program operation to the next page may be carried out during a second data input interval IN2 and associated second program interval PGM2 equivalent to the first data input interval IN1 and the first program interval PGM1, respectively.

Figure 9:
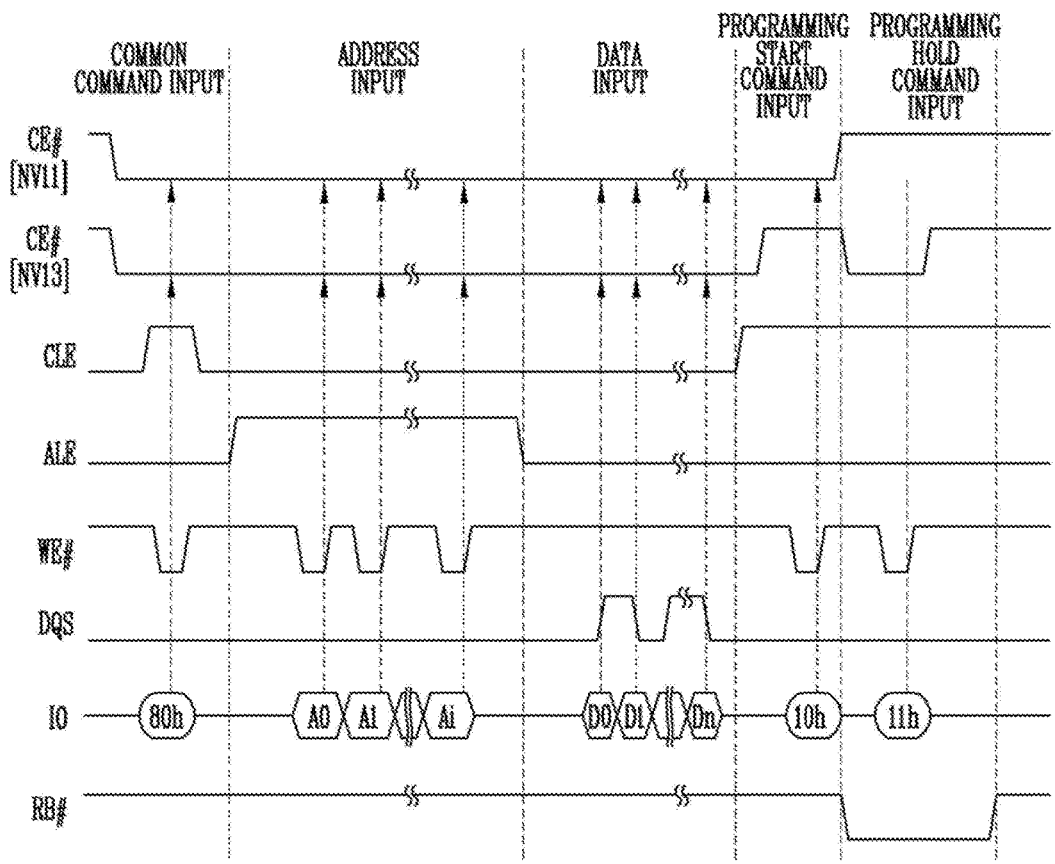
FIG. 9 is an example of a timing interval chart illustrating a method for inputting a command and data during a program operation as shown in FIG. 8.

A method for inputting the same data into all of the selected and the idle sub-memory devices during a program operation as the one shown in FIG. 8 will be described below with reference to FIG. 9. In FIG. 9 for purposes of illustration, the first sub-memory device NV11 is the selected sub-memory device while the third sub-memory device NV13 is the idle sub-memory device during the program operation. However, it is noted that invention is not limited in this way and any possible combination of a selected sub-memory and the idle sub-memory devices may be possible. For example, the fifth sub-memory device NV15 may be the idle sub-memory device while the second sub-memory device NV2 may be the selected sub-memory device.

Referring to FIGS. 4 and 9, a program process may include a common command input interval during which the program operation is prepared with respect to the selected first and the idle third sub-memory devices NV11 and NV13; an address input interval during which an address is inputted to the selected first and the idle third sub-memory devices NV11 and NV13; a data input interval during which data is inputted to the selected first and the idle third sub-memory devices NV11 and NV13; a program start command input interval during which the program start command is inputted to the selected first sub-memory device NV11; and a program-hold interval during which the program operation is not performed to the idle third sub-memory device NV13 during the program operation to the selected first sub-memory device NV11. Each interval will be described in details below.

During the common command input interval, a chip enable signal CE# as a low level may be applied to the selected first and the idle third sub-memory devices NV11 and NV13, so that the program command 80h may be sent to the selected first and the idle third sub-memory devices NV11 and NV13 commonly via an input/output terminal IO. For example, remaining idle sub-memory devices may be provided with chip enable signals CE# as a high level. In order to inform the command inputting, a command latch enable signal CLE may be set to a high level, and in turn, the program command 80h may be provided through the input/output terminal IO. When the write enable signal WE# transitions from a low level to a high level, the program command 80h may be applied, at the same time, both to the selected first and the idle third sub-memory devices NV11 and NV13. For example, at a rising edge of the write enable signal WE#, the program command 80h may be applied to the selected first and the idle third sub-memory devices NV11 and NV13. When each of the first and third sub-memory devices NV11 and NV13 receives the program command 80h, the command latch enable signal CLE may transition from the high level again to a low level.

During the address input interval, the address latch enable signal ALE for loading an address may transition from a low level to a high level. Because the address should be applied commonly to the selected first and the idle third sub-memory devices NV11 and NV13, the chip enable signal CE# applied to the selected first and the idle third sub-memory devices NV11 and NV13 may be kept in a low level. An address set A0 to Ai (i includes a positive integer) may be loaded sequentially to the input/output terminal IO. The input/output terminal IO may output concurrently the loaded address set A0 to Ai to the selected first and the idle third sub-memory devices NV11 and NV13 at a rising edge of the write enable signal WE#. When each of the selected first and the idle third sub-memory devices NV11 and NV13 receives the address set A0 to Ai, the address latch enable signal ALE may transition again to a low level.

During the data input interval, data set D0 to Dn (n includes a positive integer) may be loaded sequentially to the input/output terminal IO. The input/output terminal IO may output concurrently the loaded data set A0 to An to the selected first and the idle third sub-memory devices NV11 and NV13 in response to a data strobe signal DQS. According to an embodiment, the data set A0 to An may be inputted to the selected first and the idle third sub-memory devices NV11 and NV13 at both of rising and falling edges of the data strobe signal DQS.

During the program start command input interval, the chip enable signal CE# applied to the idle third sub-memory device NV13 may transition to a high level while the chip enable signal CE# applied to the selected first sub-memory device NV11 is kept at a low level. To perform a program operation to the selected first sub-memory device NV11, the program start command 10h may be loaded to the input/output terminal IO. In order for the input/output terminal IO to input the loaded program start command 10h to the selected first sub-memory device NV11, the write enable signal WE# may transition from a high level to a low level, and again to high level. For example, since the program start command 10h is inputted to the selected first sub-memory device NV11 at a rising edge of the write enable signal WE#, the write enable signal WE# of a high level may transition to a low level and, then, to a high level.

During the program-hold interval, the controller 1200 may control the peripheral circuit to start to perform a program operation to the selected first sub-memory device NV11. During the program operation to the selected first sub-memory device NV11, the ready-busy signal RB# may transition from a high level to a low level, and then may be kept in a low level. During the program operation to the selected first sub-memory device NV11, the idle third sub-memory device NV13 should be in a program-held state thereto. For example, the chip enable signal CE# applied to the selected first sub-memory device NV11 may transition to a high level while the chip enable signal CE# applied to the idle third sub-memory device NV13 may transition to a low level. In order for the third sub-memory device NV13 to maintain the program-held state thereof, a hold command 11h may be loaded to the input/output terminal IO. In order for the input/output terminal IO to input the loaded hold command 11h to the third sub-memory device NV13, the write enable signal WE# may transition from a high level to a low level, and, again to a high level. For example, since the hold command 11h should be applied to the third sub-memory device NV13 at a rising edge of the write enable signal WE#, the write enable signal WE# of a high level may transition to a low level and, then, to a high level.

The different sub-memory devices may concurrently receive the same data, and then may be in different operation states. This may be achieved, as addressed above, via the control of the chip enable signal CE# so that the same data is inputted concurrently to the different sub-memory devices, and via the application of the different commands so that the different sub-memory devices may be in different operation states.

Figure 10:
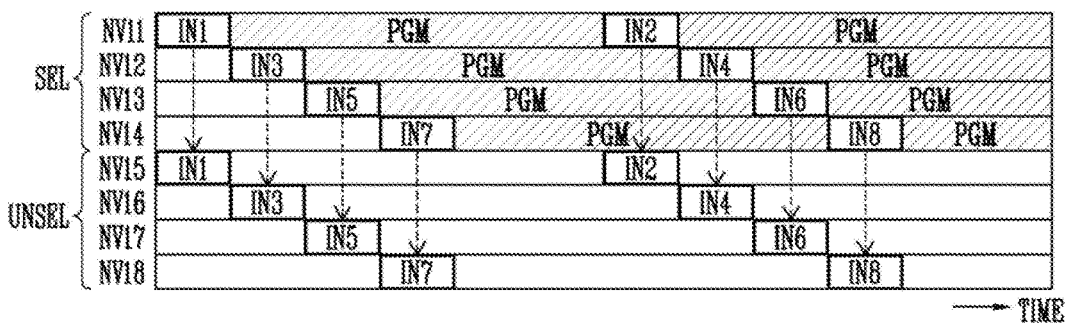
FIG. 10 is a timing diagram illustrating an embodiment of a program operation.

FIG. 10 is a timing diagram illustrating an embodiment of the program operation in FIG. 7.

Referring to FIG. 10, the program operation may proceed in a timing sequence as shown in order to perform a program operation to selected sub-memory devices SEL among the sub-memory devices NV11 to NV18 coupled to the same channel. For example, the selected sub-memory devices SEL may be the first to fourth sub-memory devices NV11 to NV14 while the remaining idle or non-selected sub-memory devices IDLE may be the fifth to eighth sub-memory devices NV15 to NV18.

A first data may be inputted both to the selected first sub-memory device NV11 and the idle fifth sub-memory device NV15. A second data may be inputted both to the selected second sub-memory device NV12 and to the idle sixth sub-memory device NV16. A third data may be inputted both to the selected third sub-memory device NV13 and the idle seventh sub-memory device NV17. A fourth data may be inputted both to the selected fourth sub-memory device NV14 and the idle eighth sub-memory device NV18. The above mentioned combinations, are only examples to facilitate the following description. It is noted therefore, that any combinations of a selected device and an associated idle device may be employed. For example, the first data may be inputted both to the selected first sub-memory device NV11 and the idle eighth sub-memory device NV18. The second data may be inputted both to the selected second sub-memory device NV12 and the idle seventh sub-memory device NV17. The third data may be inputted both to the selected third sub-memory device NV13 and the idle sixth sub-memory device NV16. The fourth data may be inputted both to the selected fourth sub-memory device NV14 and the idle fifth sub-memory device NV15. An example of a timing sequence for the program operation for the selected sub-memory devices will be described below.

First Data Input Interval IN1

During a first data input interval IN1, the first data may be inputted concurrently both to the selected first sub-memory device NV11 and the idle fifth sub-memory device NV15. According to an embodiment, the first data may be inputted concurrently both to a page buffer of the selected first sub-memory device NV11 and a page buffer of the idle fifth sub-memory device NV15. Hence, when the selected first sub-memory device NV11 has a program-failure thereto, the first data not from the buffer memory 1210 but from the idle fifth sub-memory device NV15 coupled to the same channel as the first sub-memory device NV11 may be available.

Program Interval PGM1

During a first program interval PGM1 after the first data input interval IN1, the controller 1200 may control the peripheral circuit to perform a program operation to the selected first sub-memory device NV11 with the first data stored in the page buffer (for example, a sub-page buffer corresponding to a selected page) of the first sub-memory device NV11. According to an embodiment, the program operation may be performed with respect to the selected memory page in a selected memory block in the selected first sub-memory device NV11. While in this state, a program operation may not be performed with respect to the idle fifth sub-memory device NV15.

When the first sub-memory device NV11 comes into a program-fail state, the controller 1200 may transfer the first data from the idle fifth sub-memory device NV15 to the selected first sub-memory device NV11 via the buffer memory 1210. For example, the controller 1200 may change the address indicating another page of the same memory block or a page of another memory block in the selected first sub-memory device NV11 for the program operation. Then, the controller 1200 may control the peripheral circuit to perform a program operation to the selected first sub-memory device NV11 according to the changed address. Alternatively, the controller 1200 may change the selected sub-memory device from the first sub-memory device NV11 to one of the second to eighth idle sub-memory devices NV12 to NV18 for the program operation.

Second Data Input Interval IN2

When the selected page of the selected first sub-memory device NV11 has a program-success thereto during the first program interval PGM1, the page buffers (more specifically, the sub-page buffers PB1 to PBi in FIG. 5) of the idle fifth sub-memory device NV15 may be reset. Then, the controller 1200 may control the peripheral circuit to perform a program operation to a next page of the selected first sub-memory device NV11. Upon completion of the program operation to the selected page, the next page may be subjected to the program operation. The program operation to the next page may be carried out during a second data input interval IN2 and associated second program interval PGM2 equivalent respectively to the first data input interval IN1 and the first program interval PGM1 as mentioned above.

During a second data input interval IN2 for the program operation to the next page of the selected first sub-memory device NV11 after the first program interval PGM1, the second data may be inputted concurrently both to the selected first sub-memory device NV11 and the idle fifth sub-memory device NV15. According to an embodiment, the second data may be inputted concurrently both to a page buffer of the first sub-memory device NV11 and a page buffer of the fifth sub-memory device NV15. For example, different sub-page buffers in each page buffer may be used for the first and second data provided during the first and second data input intervals IN1 and IN2 due to different selected pages for the first and second data. Hence, when the selected first sub-memory device NV11 has a program-failure thereto, the first and second data not from the buffer memory 1210 but from the idle fifth sub-memory device NV15 coupled to the same channel as the first sub-memory device NV11 may be available.

Second Program Interval PGM2

During a second program interval PGM2 after the second data input interval IN2, the controller 1200 may control the peripheral circuit to perform a program operation to the selected first sub-memory device NV11 with the second data stored in the page buffer (for example, the changed sub-page buffer corresponding to the current page) of the first sub-memory device NV11. According to an embodiment, the program operation may be performed with respect to the current selected page in the selected memory block in the selected first sub-memory device NV11. While in this state, a program operation may not be performed with respect to the idle fifth sub-memory device NV15.

When the first sub-memory device NV11 comes into a program-fail state, the controller 1200 may transfer the second data from the idle fifth sub-memory device NV15 to the selected first sub-memory device NV11 via the buffer memory 1210. For example, the controller 1200 may change the address indicating another page of the same memory block or a page of another memory block in the selected first sub-memory device NV11 for the program operation. Then, the controller 1200 may control the peripheral circuit to perform a program operation to the selected first sub-memory device NV11 according to the changed address. Alternatively, the controller 1200 may change the selected sub-memory device from the first sub-memory device NV11 to one of the second to eighth idle sub-memory devices NV12 to NV18 for the program operation.

When the selected page of the selected first sub-memory device NV11 has a program-success thereto during the second program interval PGM2, the page buffers (more specifically, the sub-page buffers PB1 to PBi in FIG. 5) of the idle fifth sub-memory device NV15 may be reset. Then, the controller 1200 may control the peripheral circuit to perform a program operation to a next page of the selected first sub-memory device NV11. A subsequent operation for the next page may be performed in the same manner as above.

Third Data Input Interval IN3

A data input interval IN3 for the program operation to the selected second and the idle sixth sub-memory devices NV12 and NV16 may be disposed between the first data input interval IN1 and second data input interval IN2 so that the data input interval IN3 may not overlap with the first data input interval IN1 and second data input interval IN2. All of the first to eighth sub-memory devices NV11 to NV18 commonly sharing the same channel may not transfer different data at the same time.

During the third input interval IN3, the third data may be inputted concurrently both to the selected second sub-memory device NV12 and the idle sixth sub-memory device NV16. According to an embodiment, the third data may be inputted concurrently both to a page buffer of the selected second sub-memory device NV12 and a page buffer of the idle sixth sub-memory device NV16. Hence, when the selected first sub-memory device NV11 has a program-failure thereto, the third data not from the buffer memory 1210 but from the idle sixth sub-memory device NV16 coupled to the same channel as the second sub-memory device NV12 may be available.

Third Program Interval PGM3

During a third program interval PGM3 after the third data input interval IN3, the controller 1200 may control the peripheral circuit to perform a program operation to the selected second sub-memory device NV12 may be programmed with the third data stored in the page buffer (for example, a sub-page buffer corresponding to a selected page) of the second sub-memory device NV12. According to an embodiment, the program operation may be performed with respect to the selected memory page in a selected memory block in the selected second sub-memory device NV12. While in this state, a program operation may not be performed with respect to the idle sixth sub-memory device NV16.

When the second sub-memory device NV12 comes into a program-fail state, the controller 1200 may transfer the third data from the idle sixth sub-memory device NV16 to the selected second sub-memory device NV12 via the buffer memory 1210. For example, the controller 1200 may change the address indicating another page of the same memory block or a page of another memory block in the selected second sub-memory device NV12 for the program operation. Then, the controller 1200 may control the peripheral circuit to perform a program operation to the selected second sub-memory device NV12 according to the changed address. Alternatively, the controller 1200 may change the selected sub-memory device from the second sub-memory device NV12 to one of the first and third to eighth idle sub-memory devices NV11 and NV13 to NV18 for the program operation.

Fourth Data Input Interval IN4

When the selected page of the selected second sub-memory device NV12 has a program-success thereto during the third program interval PGM3, the page buffers (more specifically, the sub-page buffers PB1 to PBi in FIG. 5) of the idle sixth sub-memory device NV16 may be reset. Then, the controller 1200 may control the peripheral circuit to perform a program operation to a next page of the selected second sub-memory device NV12. Upon completion of the program operation to the selected page, the next page may be subjected to the program operation. The program operation to the next page may be carried out during a fourth data input interval IN4 and associated fourth program interval PGM4 equivalent respectively to the third data input interval IN3 and the third program interval PGM3 as mentioned above.

During a fourth data input interval IN4 for the program operation to the next page of the selected second sub-memory device NV12 after the third program interval PGM3, the fourth data may be inputted concurrently both to the selected second sub-memory device NV12 and the idle sixth sub-memory device NV16. According to an embodiment, the fourth data may be inputted concurrently both to a page buffer of the selected second sub-memory device NV12 and a page buffer of the idle sixth sub-memory device NV16. For example, different sub-page buffers in each page buffer may be used for the third and fourth data provided during the third and fourth data input intervals IN3 and IN4 due to different selected pages for the third and fourth data. Hence, when the selected second sub-memory device NV12 has a program-failure thereto, the third and fourth data not from the buffer memory 1210 but from the idle sixth sub-memory device NV16 coupled to the same channel as the second sub-memory device NV12 may be available.

Fourth Program Interval PGM4

During a fourth program interval PGM4 after the fourth data input interval IN4, the controller 1200 may control the peripheral circuit to perform a program operation to the selected second sub-memory device NV11 may be programmed with the fourth data stored in the page buffer (for example, the changed sub-page buffer corresponding to the current page) of the second sub-memory device NV12. According to an embodiment, the program operation may be performed with respect to the current selected page in the selected memory block in the selected second sub-memory device NV12. While in this state, a program operation may not be performed with respect to the idle sixth sub-memory device NV16.

When the second sub-memory device NV12 comes into a program-fail state, the controller 1200 may transfer the fourth data from the idle sixth sub-memory device NV16 to the selected second sub-memory device NV12 via the buffer memory 1210. For example, the controller 1200 may change the address indicating another page of the same memory block or a page of another memory block in the selected second sub-memory device NV12 for the program operation. Then, the controller 1200 may control the peripheral circuit to perform a program operation to the selected second sub-memory device NV12 according to the changed address. Alternatively, the controller 1200 may change the selected sub-memory device from the second sub-memory device NV12 to one of the first and third to eighth idle sub-memory devices NV11 and NV13 to NV18 for the program operation.

When the selected page of the selected second sub-memory device NV12 has a program-success thereto during the fourth program interval PGM4, the page buffers (more specifically, the sub-page buffers PB1 to PBi in FIG. 5) of the idle sixth sub-memory device NV16 may be reset. Then, the controller 1200 may control the peripheral circuit to perform a program operation to a next page of the selected second sub-memory device NV12. A subsequent operation for the next page may be performed in the same manner as above.

Thereafter, in the same manner as in the first to fourth data intervals IN1 to IN4 and the first and fourth program intervals PGM1 to PGM4, fifth to eighth data input intervals IN5 to IN8 and associated fifth to eighth program operation intervals PGM5 to PGM8 may proceed.

Figure 11:
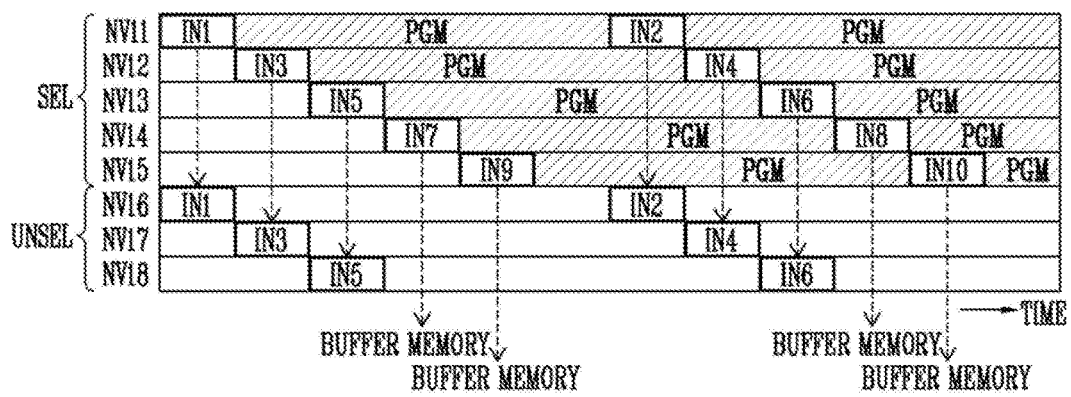
FIG. 11 is a timing diagram illustrating another embodiment of a program operation in FIG. 7.

FIG. 11 is a timing diagram illustrating another embodiment of a program operation in FIG. 7.

Referring to FIG. 11, a program operation may proceed in a timing sequence as shown in order to perform a program operation to the selected sub-memory devices SEL among the sub-memory devices NV11 to NV18 coupled to the same channel. In this embodiment, the number of the selected sub-memory devices SEL may be larger than the number of the idle or non-selected sub-memory devices IDLE. For example, the selected sub-memory devices SEL may be the first to fifth sub-memory devices NV11 to NV15 while the remaining idle or non-selected sub-memory devices IDLE may be the sixth to eighth sub-memory devices NV16 to NV18. This division is exemplary for the sake of convenience of the description as will be made below.

First to Sixth Data Input Intervals IN1 to IN6 and Associated Program Intervals PGM1 to PGM6

During the first to sixth data input intervals IN1 to IN6 and corresponding first to sixth program intervals PGM1 to PGM6, the program operations to the selected first to third sub-memory devices NV11 to NV13 and the idle sixth to eighth sub-memory devices NV16 to NV18 may be the same as described with reference to FIG. 10.

Seventh to Tenth Data Input Intervals IN7 to IN10 and Associated Program Intervals PGM7 to PGM10

When the memory system 1000 does not have enough idle sub-memory devices for the selected fourth and fifth sub-memory devices NV14 and NV15, as exemplified in FIG. 11, the selected fourth and fifth sub-memory devices NV14 and NV15 may employ the data not from the idle device but from the buffer memory 1210 in the controller 1200. In the event of program-failure of the fourth and fifth sub-memory devices NV14 and NV15, the controller 1200 may provide temporarily stored data of the buffer memory 1210 to the fourth and fifth sub-memory devices NV14 and NV15, respectively. For example, the controller 1200 may change the address indicating another page of the same memory block or a page of another memory block in the selected fourth and fifth sub-memory devices NV14 and NV15 for the program operation. Then, the controller 1200 may control the peripheral circuit to perform a program operation to the selected fourth and fifth sub-memory devices NV14 and NV15, according to the changed address. Alternatively, the controller 1200 may change the selected sub-memory device from the fourth and fifth sub-memory devices NV14 and NV15 to one of the first to third and sixth to eighth idle sub-memory devices NV11 to NV13 and NV16 to NV18 for the program operation.

In accordance with the present disclosure, during a program operation, the buffer memory 1210 in the controller 1200 may be less frequently accessed. This may reduce the load of the controller 1200, and may preserve memory space in a buffer memory of the controller. Further, via the concurrent inputting of the data into the different sub-memory devices sharing the same channel, data transmission time may be shortened, resulting in an enhanced performance of the controller.

Figure 12:
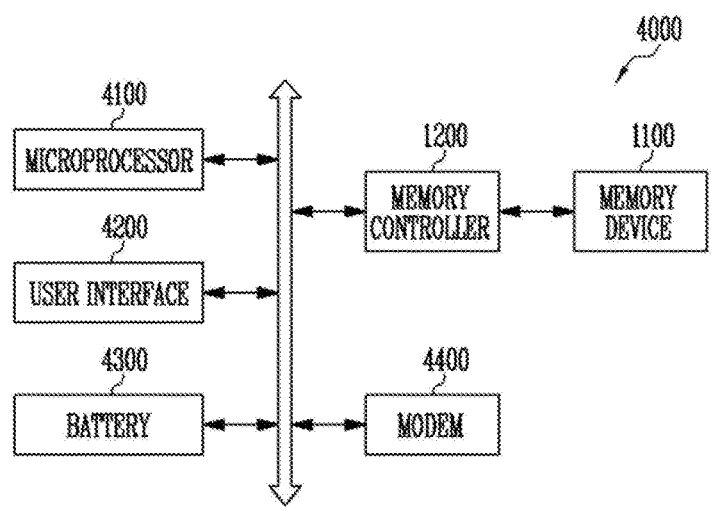
FIG. 12 is a diagram of a computing system including a memory system, according to an embodiment of the present disclosure.

FIG. 12 is a diagram of a computing system including a memory system, according to an embodiment of the present disclosure.

Referring to FIG. 12, a computing system 4000, according to an embodiment of the present disclosure, may include the memory device 1100, the memory controller 1200, a microprocessor 4100, a user interface 4200 and a modem 4400, all of which may be electrically connected to each other via a system bus. The computing system 4000 may be implemented in a mobile device, and may for example comprise a battery (not shown) to supply an operation voltage thereof. It may be appreciated that the computing system 4000 may be further provided with an application chipset, camera image processor (CIS), mobile DRAM, and the like as may be needed. In an embodiment, the memory controller 1200 and the memory device 1110 may be configured together to form an SSD (Solid State Drive/Disk).

The computing system 4000 may include the memory device 1100 including at least one sub-memory device group, each group including a plurality of sub-memory devices, each group being assigned each channel. The controller 1200 may be configured for controlling the memory device. The controller 1200 may be further configured: to store data both into a selected sub-memory device for the program operation and into at least one non-selected sub-memory device for the program operation, wherein the selected and non-selected sub-memory devices belonging to a single sub-memory device group; (a) to allow the selected sub-memory device to be programmed with the data stored therein; and in a failure event of the (a) program operation for the selected sub-memory device, (b) to allow the selected sub-memory device to be programmed with the data stored in the non-selected sub-memory device.

In one implementation, the memory system (1200 and 1100) in the computing system 4000 may be packaged in various forms. For example, such packages may include, but not be limited to PoP (Package on Package), Ball grid arrays (BGAs), Chip scale packages (CSPs), Plastic Leaded Chip Carrier (PLCC), Plastic Dual In Line Package (PDIP), Die in Waffle Pack, Die in Wafer Form, Chip On Board (COB), Ceramic Dual In Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP) or the like.

The above description is not to be taken in a limiting sense, but is made merely for the purpose of describing embodiments of the invention. Many additional embodiments will be apparent to a skilled person after having read the present disclosure without departing from the scope of the invention as defined by the appended claims.

What is claimed is:

1. A memory system, comprising:
   a memory device including a plurality of sub-memory devices coupled to a channel; and
   a controller suitable for controlling the memory device to store a first data into a selected sub-memory device and at least one idle sub-memory device among the sub-memory devices when a first program operation of the selected sub-memory device among the sub-memory devices with the first data is performed; and to perform a second program operation to the selected sub-memory device with the first data stored in the idle sub-memory device when the first program operation to the selected sub-memory device fails.

2. The memory system of claim 1, wherein each sub-memory devices includes a page buffer suitable for storing the first data.

3. The memory system of claim 1, wherein the controller inputs the first data into the selected sub-memory device and the idle sub-memory device at the same time.

4. The memory system of claim 1, wherein the controller comprises a buffer memory for storing data temporarily.

5. The memory system of claim 4, wherein the controller transfers the first data from the idle sub-memory device to the selected sub-memory through the buffer memory for the second program operation when the first program operation to the selected sub-memory fails.

6. The memory system of claim 5, wherein the controller controls a peripheral circuit to perform the second program operation to the selected sub-memory device by changing an address indicating another memory area of the selected sub-memory device for the second program operation.

7. The memory system of claim 1, wherein the controller provides an address to the selected and the idle sub-memory devices before storing the first data in the idle sub-memory device.

8. The memory system of claim 1, wherein the idle sub-memory device is coupled to the channel same as that of the selected sub-memory device.

9. The memory system of claim 1, wherein the controller resets a page buffer, in which the first data is stored, of the idle sub-memory device when the first program operation of the sub-memory device is successful.

10. The memory system of claim 1, wherein when the first data are stored in a plurality of the idle sub-memory devices and a read operation is performed on one of the idle sub-memory devices, the controller resets a page buffer of the idle sub-memory device on which the read operation is to be performed in response to a new command as long as the at least one idle sub-memory device in which the first data is stored remains.

11. A method of operating a memory system comprising:
    inputting first data into a first sub-memory device and a second sub-memory device coupled to a same channel;
    performing a first program operation of the first sub-memory device with the first data inputted into the first sub-memory device; and
    performing a second program operation to the first sub-memory device with the first data stored in the second sub-memory device when the first program operation fails.

12. The method of claim 11, further comprises deleting the first data from the second sub-memory device when the first program operation is successful.

13. The method of claim 11, wherein the first program operation is performed to a selected page of a selected memory block, among memory blocks in the first sub-memory device.

14. The method of claim 13, wherein the performing of the second program operation includes changing an address indicating another memory area of the selected sub-memory device for the second program operation.

15. The method of claim 14, wherein the address indicates one or more of a page and a memory block included in the first sub-memory device.

16. A method of operating a memory system, comprising:
    inputting a program command for a first program operation of a first sub-memory device into the first sub-memory device and a second sub-memory devices;
    inputting an address and a first data for the first program operation into the first and second sub-memory devices;
    inputting a program start command for the first program operation into the first sub-memory device; and
    inputting a program holding command to the second sub-memory device to stay idle during the first program operation.

17. The method of claim 16, wherein each of inputting of the program command and the inputting of the address and the first data comprises:
    inputting active chip enable signals to the first and second sub-memory devices, and
    inputting inactive chip enable signals to remaining sub-memory devices, except for the first and second sub-memory devices.

18. The method of claim 16, wherein the inputting of the program start command comprises:
    inputting an active chip enable signal to the first sub-memory device, and inputting an inactive chip enable signal to the second sub-memory device.

19. The method of claim 16, wherein the inputting of the program holding command comprises:

inputting an inactive chip enable signal to the first sub-memory device, and inputting an active chip enable signal to the second sub-memory device.

20. The method of claim 16, further comprises:

performing a second program operation to the first sub-memory device with the first data stored in the second sub-memory device when the first program operation fails.

* * * * *